(12) United States Patent
Kilduff

(10) Patent No.: US 6,386,414 B1
(45) Date of Patent: May 14, 2002

(54) SPORTS EQUIPMENT BAG

(76) Inventor: Edward Kilduff, 128 Wooster St., New York, NY (US) 10012

( * ) Notice: Subject to any disclaimer, the term of this patent is extended or adjusted under 35 U.S.C. 154(b) by 0 days.

(21) Appl. No.: 09/547,814

(22) Filed: Apr. 11, 2000

(51) Int. Cl.$^7$ .......................... A45F 3/04; B65D 30/06; B65D 33/01
(52) U.S. Cl. .................. 224/638; 383/102; 383/117
(58) Field of Search ................. 383/100, 102, 383/117; 119/500, 497; 224/638

(56) References Cited

U.S. PATENT DOCUMENTS

| | | | | |
|---|---|---|---|---|
| 1,251,404 A | * | 12/1917 | Mills | |
| 3,045,900 A | * | 7/1962 | Zekendorf | 150/106 |
| 3,264,755 A | * | 8/1966 | Moore | |
| 3,674,073 A | * | 7/1972 | Hendor | |
| 4,921,103 A | | 5/1990 | Cohen | |
| 5,088,728 A | * | 2/1992 | Deden | 224/638 |
| 5,117,883 A | | 6/1992 | Chen | |
| 5,154,266 A | * | 10/1992 | Bieber et al. | 190/109 |
| 5,288,150 A | * | 2/1994 | Bearman | |
| 5,323,897 A | * | 6/1994 | Sperber | |
| 5,413,199 A | * | 5/1995 | Clement | |
| 5,620,069 A | * | 4/1997 | Hurwitz | 190/107 |
| 5,676,296 A | * | 10/1997 | Masters | |
| 5,794,747 A | * | 8/1998 | Bryant | |
| 5,931,120 A | * | 8/1999 | Burns et al. | 119/497 |
| 5,941,195 A | * | 8/1999 | Martz | 119/497 |
| 5,950,894 A | * | 9/1999 | Haber | 224/627 |
| 6,076,485 A | * | 6/2000 | Peeples et al. | 119/497 |
| 6,082,305 A | * | 7/2000 | Burns et al. | 119/497 |

OTHER PUBLICATIONS

Patagonia "Wet/Dry Gear Bags", www. patagonia.com, available before Apr. 11, 2000.*

* cited by examiner

Primary Examiner—Stephen P. Garbe
(74) Attorney, Agent, or Firm—Volpe and Koenig, P.C.

(57) ABSTRACT

A sports equipment bag having a water-resistant outer shell with multiple ventilation assemblies for exposing the interior of the bag to free air circulation. Each ventilation assembly includes an opening formed in the outer shell that is covered by a mesh lining and a flap which can be selectively opened and closed using a zipper. In one embodiment, the bag includes openings on both sides and both ends of the bag. In an alternate embodiment, the bag includes openings on both sides only. In another alternate embodiment, the bag includes an opening at one end and a fan assembly located at the other end. The fan assembly includes an electric fan which draws air through the bag.

21 Claims, 9 Drawing Sheets

SPORTS EQUIPMENT BAG

BACKGROUND OF THE INVENTION

1. Field of the Invention

This invention relates to a bag for carrying sports equipment to and from an athletic event.

2. Description of Related Art

When a person is engaged in an organized sport, such as basketball, hockey, baseball, football, track, tennis, etc., uniforms and other equipment must be carried to and from the contest. While playing, athletes sweat, causing their uniforms to become wet and smelly. After the game, the players shower, but their uniforms and equipment do not. Instead, they are thrown into a bag for transport home. Sometimes it is days before they are unpacked for cleaning. Mildew, odors, and deterioration of clothing result, conditions which are alleviated by the disclosed invention.

In addition, sports equipment, e.g., shoes, pads, balls, pucks, racquets, etc., often become wet and/or dirty. It is desirable to be able to convey them safely without soiling the environment around them, such as the bus, car, or house through which they travel before they can be cleaned.

Prior inventors have addressed some of these issues. A representative sample known to the inventor follows:

U.S. Pat. No. 1,251,404 issued to Mills discloses a beach bag having a top compartment for receiving wet swimsuits, towels, etc., connected to a lower, water-tight compartment by means of apertures in a dividing wall. Dripping wet items drain their fluids through the apertures into the lower compartment where they are trapped until the reservoir can be emptied through a closable outlet. While loose liquids can drip from the wet items, the items themselves do not dry. They remain moist and subject to mildew and rot, until they are removed from the beach bag.

U.S. Pat. No. 3,264,755 issued to Moore discloses a clothes drying bag in which a fluid-tight bag is divided into two compartments: one, a pressure compartment selectively attached through an open connector to the outlet hose of a hair dryer, and two, a drying compartment into which wet clothing is placed. Venturi ports connect the two compartments which allow heated air to be forced through the compartments to escape through eight small holes at the top of the second compartment. Until the hair dryer is attached, the clothes remain damp and sealed in a virtually air tight bag. However, loose water is free to drain out indiscriminately through the holes and the open connector onto whatever is near.

U.S. Pat. No. 3,674,073 issued to Hendon discloses a cotton harvesting bag made of waterproof material for storing newly harvested cotton. A pair of vents, with oversized flaps loosely hanging over them to "rainproof" the cotton, provides "for air circulation through bag 10 . . . commensurate with waterproofing." The thrust of the patent is to prevent the cotton from becoming wet, for in spite of the vents, the bag is unsuited for drying wet cotton.

U.S. Pat. No. 4,949,842 issued to Mokiao, U.S. Pat. No. 5,323,897 issued to Sperber, and U.S. Pat. No. 5,676,296 issued to Masters disclose bags with mesh exterior walls so that wet items, e.g., wetsuits, in their internal compartments can dry. There are no means provided for covering the mesh in order to seal the interior compartments. Consequently, moisture and dirt can enter through the mesh, and odors can egress therefrom. Being exposed, the mesh is subject to damage by being snagged on passing objects.

U.S. Pat. No. 5,288,150 issued to Bearman discloses a beach bag having a fluid impervious outer bag and a smaller internal mesh bag. Wet beach clothing, towels, etc., are placed in the mesh bag where the sand thereon can sift through the mesh into the outer bag. The outer bag has a pair of openings, one in the top for entry into the mesh bag and one in the bottom for dumping the sand from the beach bag. Bearman does not contemplate the problem of drying the clothing while in the bag, and the two openings, normally closed, would be insufficient even if opened to allow the clothing to dry.

U.S. Pat. No. 5,413,199 issued to Clement discloses a sports equipment bag having a water resistant outer bag and a removable inner mesh bag. The outer bag has external pockets for such items as shoes and other sports equipment. Sweaty uniforms and other wet equipment are placed in the mesh bag for transport. Should the athlete not take the time to remove the mesh bag, it remains totally confined in the outer bag, and the wet clothing is once again subject to rotting or mildew. If the athlete is diligent and removes the mesh bag, air will circulate through the mesh material, permitting the wet items to dry. But then the two bags must once again be reassembled.

OBJECTS AND SUMMARY OF THE INVENTION

It is an object of the invention to provide a sports bag designed to transport wet or damp articles enable wet or damp articles stored within to dry without being removed from the bag.

It is a further object of the invention to provide a sports bag which can be used to transport wet and dirty articles without soiling surfaces to which the bag comes in contact.

It is a further object of the invention to provide a sports bag having a top opening for removing and inserting articles which can be easily opened and closed.

It is a further object of the invention to provide a sports bag which can be carried as a backpack to allow easier transport of heavy and/or bulky articles.

It is a further object of the invention to provide a sports bag having the above-noted features which is simple and economical to manufacture.

The present invention overcomes the difficulties described above by providing a sports equipment bag having a water-resistant outer shell with multiple ventilation assemblies for exposing the interior of the bag to free air circulation. Each ventilation assembly includes an opening formed in the outer shell that is covered by a mesh lining and a flap which can be selectively opened and closed using a zipper. In one embodiment, the bag includes openings on both sides and both ends of the bag. In an alternate embodiment, the bag includes openings on both sides only. In another alternate embodiment, the bag includes an opening at one end and a fan assembly located at the other end. The fan assembly includes an electric fan which draws air through the bag.

BRIEF DESCRIPTION OF THE DRAWINGS

The foregoing and other objects, aspects, uses, and advantages of the present invention will be more fully appreciated as the same becomes better understood from the following detailed description of the present invention when viewed in conjunction with the accompanying drawings, in which.

DETAILED DESCRIPTION OF THE PREFERRED EMBODIMENTS

Figure 1:
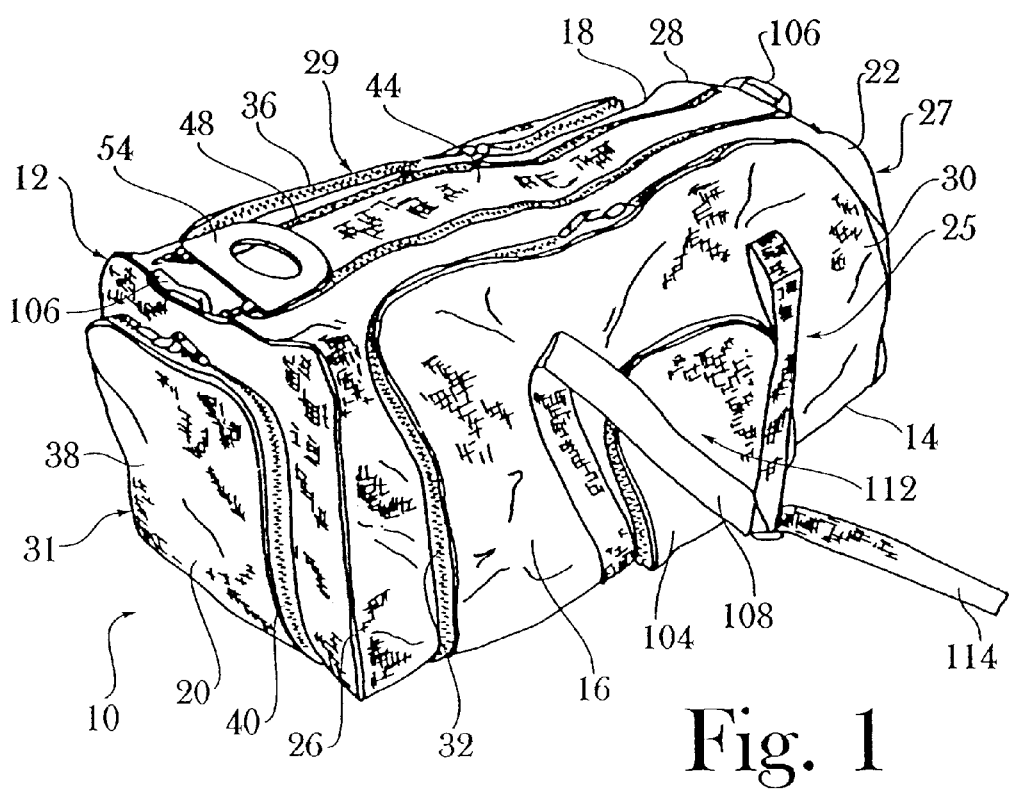
FIG. 1 is a perspective view of a first preferred embodiment of a sports bag with the flaps closed.
Figure 2:
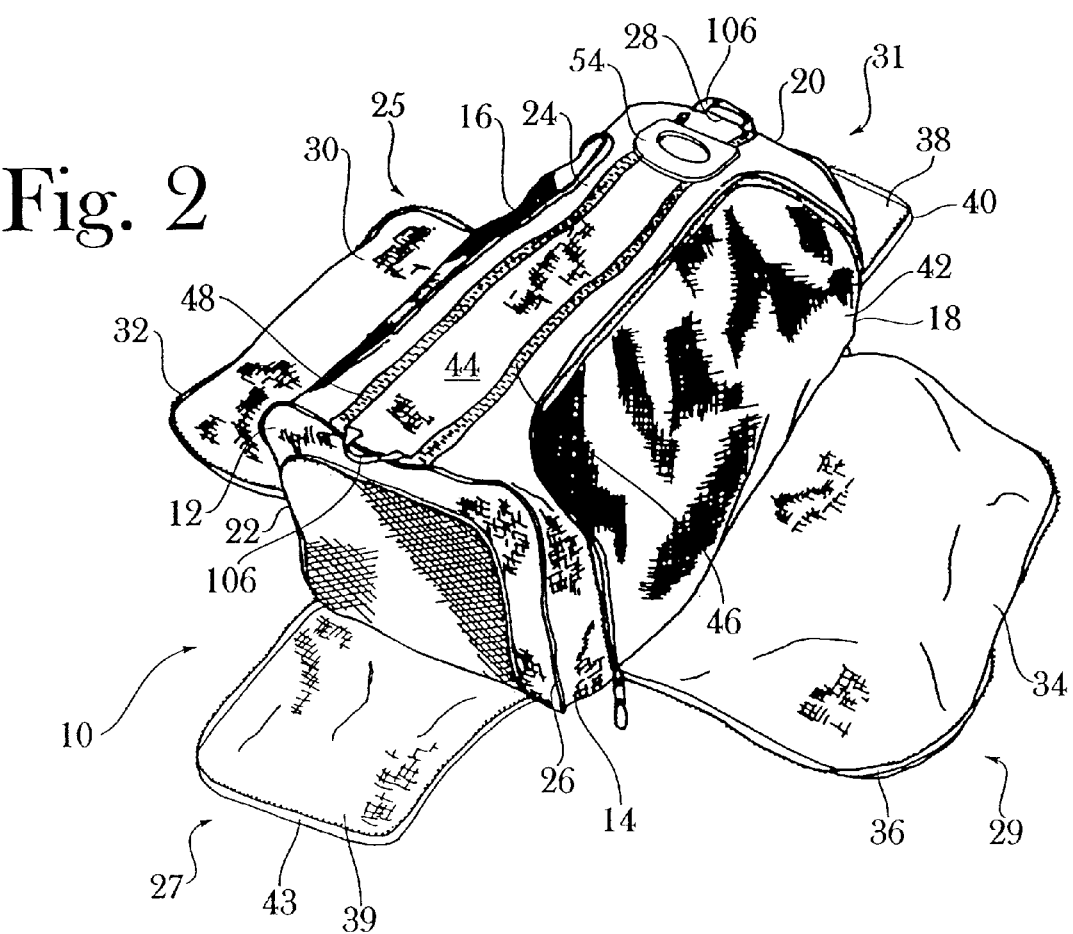
FIG. 2 is a perspective view of the inventive sports bag of FIG. 1 with the side flaps open.
Figure 6:
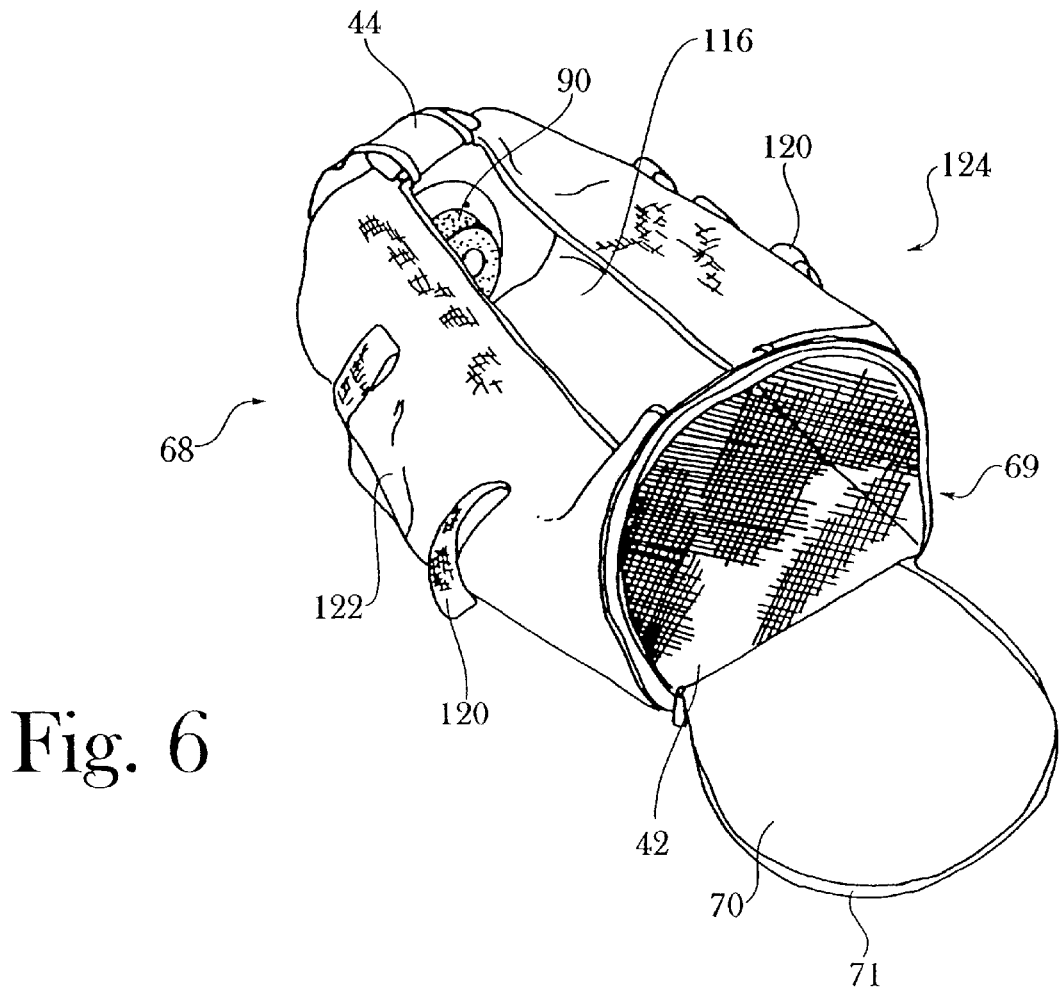
FIG. 6 is a perspective end view of a third preferred embodiment of a sports bag with the front end flap open.

Referring to FIGS. 1 and 2, a sports bag 10 is shown. The overall shape of bag 10 is preferably substantially as shown, elongated with roughly square or arcuate ends (FIGS. 2 and 6, respectively), but modifications thereof to adapt it to different sports is within the scope of the invention.

Bag 10 has an outer shell 12 formed of a water-resistant material, such as nylon fabric. Obviously, shell 12 could be formed from any suitable flexible, water-resistant material, such as vinyl or leather.

Shell 12 comprises a bottom 14 (FIG. 4), opposed sides 16 and 18, opposed front and back ends 20 and 22, respectively, and a top 24. Front end 20 is permanently joined with sides 16 and 18 and top 24 by a seam 26. Seam 28 similarly joins back end 22 with sides 16 and 18 and top 24. Seams 26 and 28 may comprise reinforced stitching, heat sealed plastic strips, or any other conventional method of forming corners of bags.

Bag 10 also includes ventilation assemblies 25, 27, 29 and 31, each of which being substantially similar in function and composition. As seen in FIGS. 1 and 2, ventilation assembly 25 is located on side 16 and includes a flap 30 which can be selectively opened and closed by a zipper 32. Ventilation assembly 27 is located on back end 22 and includes a flap 39 secured by a zipper 43. Ventilation assembly 29 is located on side 18 and includes a flap 34 secured by a zipper 36. Ventilation assembly 31 is located on front end 20 and includes a flap 38 secured by a zipper 40.

Bag 10 also includes a lining 42, which can be seen through opened flaps 30, 34 and 39 in FIG. 2. Lining 42 can be made of any flexible and durable porous material, for example, expanded mesh fabrics formed from nylon, polyester, DuPont Kevlar® fiber, or combinations of such fibers. Knitted or woven nylon is preferred because of its combination of low cost and high tensile strength. Regardless of the fabric used, lining 42 should have openings which are large enough to allow air circulation, but small enough to prevent articles stored inside bag 10 from protruding therethrough.

The function of lining 42 is to retain articles within bag 10 when flaps 30, 34 and 38 are open. Preferably, lining 42 comprises individual pieces, each of which covers one of the openings exposed when flaps 30, 34 and 38 are opened. Lining 42 is fixed around each opening, using stitching or an adhesive, sealing the perimeter against gaps. Alternatively, lining 42 could comprise a single piece of material which lines the entire interior of shell 12. Mesh lining 42, therefore, completely covers the flap openings, preventing articles stored within bag 10 from falling out while permitting air to circulate through bag 10.

It is an important feature of the invention that each of the flaps occupies a majority of the surface area, at least 50% and preferably between 75 and 90%, of its respective side or end, for when the flaps are all open, virtually the entire interior of bag 10 is open to the external environment. Unlike Moore, Hendon, and Bearman, supra, who never intended their small vents to provide air circulation for drying purposes, the wide open flaps of this invention are designed to promote natural, virtually unrestricted air flow through bag 10. And, unlike the open meshes of Mokiao, Sperber, and Masters, which are exposed to harm when in transit, the open mesh of lining 42 is protected by the flaps.

Figure 3:
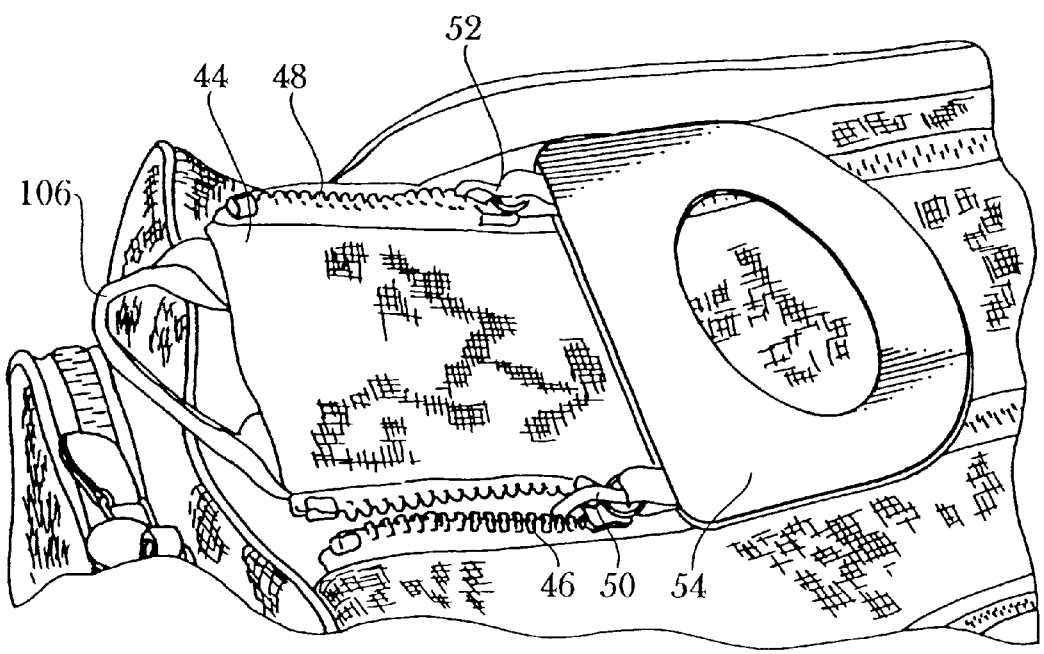
FIG. 3 is an enlarged partial view of a zipper arrangement of the invention of FIG. 1.

A relatively wide, elongated flap 44 closes most of top 24. Flap 44 extends for substantially the entire length of bag 10 and is hinged to end 22 along seam 28. Two parallel zippers 46 and 48 operate simultaneously to open or to close flap 44 under the action of zipper pulls 50 and 52 (FIG. 3). A rigid leather handle 54 is connected to zipper pulls 50 and 52 and spans the width of flap 44. Being rigid, handle 54 maintains zippers 46 and 48 in proper alignment which facilitates their operations. When flap 44 is unzipped and folded back, a large opening is provided into the interior of bag 10 which allows easy access for the insertion and removal of articles.

Figure 4:
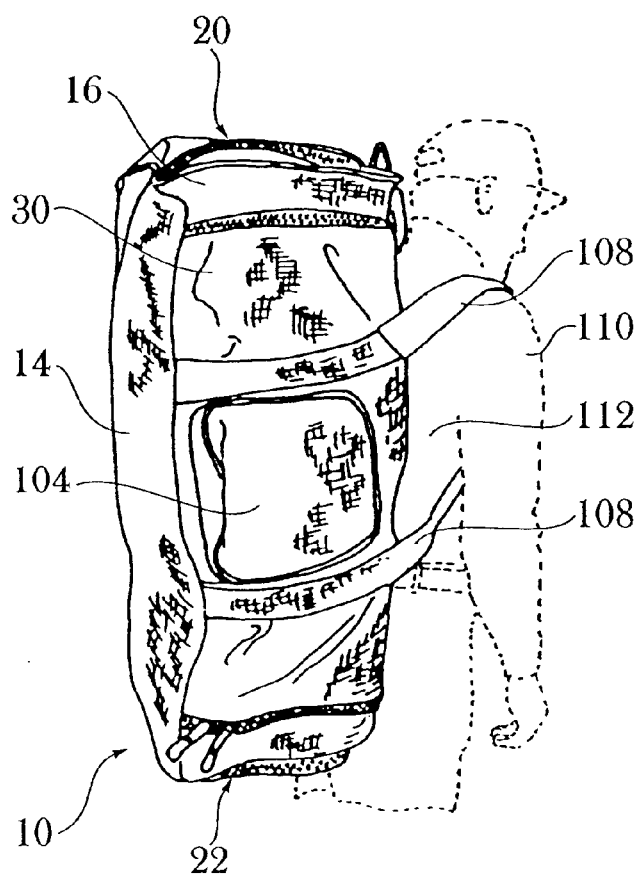
FIG. 4 is a perspective view of the sports bag of FIG. 1 fitted with back-pack straps.

Bag 10 also includes padded straps 108 for carriage of bag 10. Straps 108 may be gripped in one hand and carried horizontally, as is conventional. As shown in FIG. 4, straps 108 are also preferably designed to allow bag 10 to be carried in as a backpack (i.e., in a vertical position). The user's arm 110 slips through each loop 112 of strap 108 to support bag 10 on the shoulders. Straps 114 (FIG. 1) cross the chest and connect loops 112 to prevent straps 108 from falling off the shell of the carrier.

The basic operation of the invention is now apparent. When an athletic contest has ended, the players throw their sweat-soaked uniforms, including shirts, pants, pads, shoes, etc., into bag 10. While carrying it to the bus or car, the flaps remain closed, protecting the articles within. As soon as is practicable, when bag 10 is at rest, the flaps are opened so that air may circulate freely therethrough to begin the drying process. Even if the bag is left closed until the owner thereof arrives home, the bag does not have to be unpacked that night. Opening of the flaps allows items contained therein to dry naturally without further concern.

Figure 5:
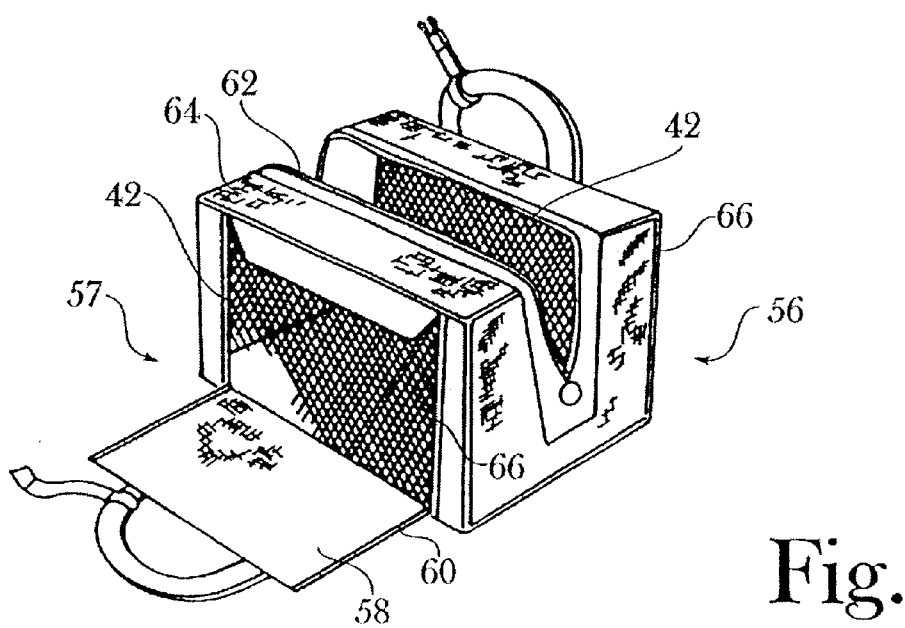
FIG. 5 is a perspective view of a second preferred embodiment of a sports bag with one of the side flaps open.

A second embodiment of the inventive concept discussed above can be seen in FIG. 5. Bag 56 is a less expensive version of bag 10, comprising only two ventilation assemblies: ventilation assembly 57 having a flap 58 secured by a zipper 60 and an identical ventilation assembly (not shown) on the opposite side of bag 56. A single zipper 62 closes top 64 which opens to provide access to the interior. Side openings, only left side opening 66 being visible, are sufficiently large that adequate air flow is provided to dry the equipment located therein.

Figure 7:
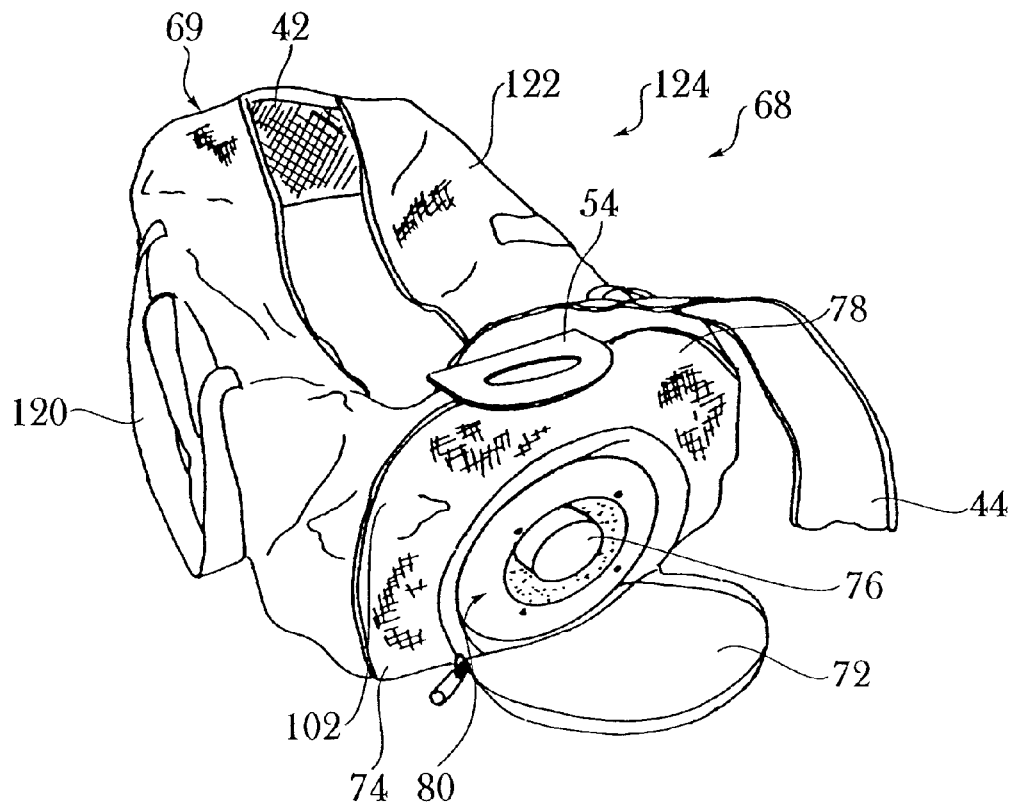
FIG. 7 is a perspective end view of the third preferred embodiment of the sports bag with the back end flap open.
Figure 8:
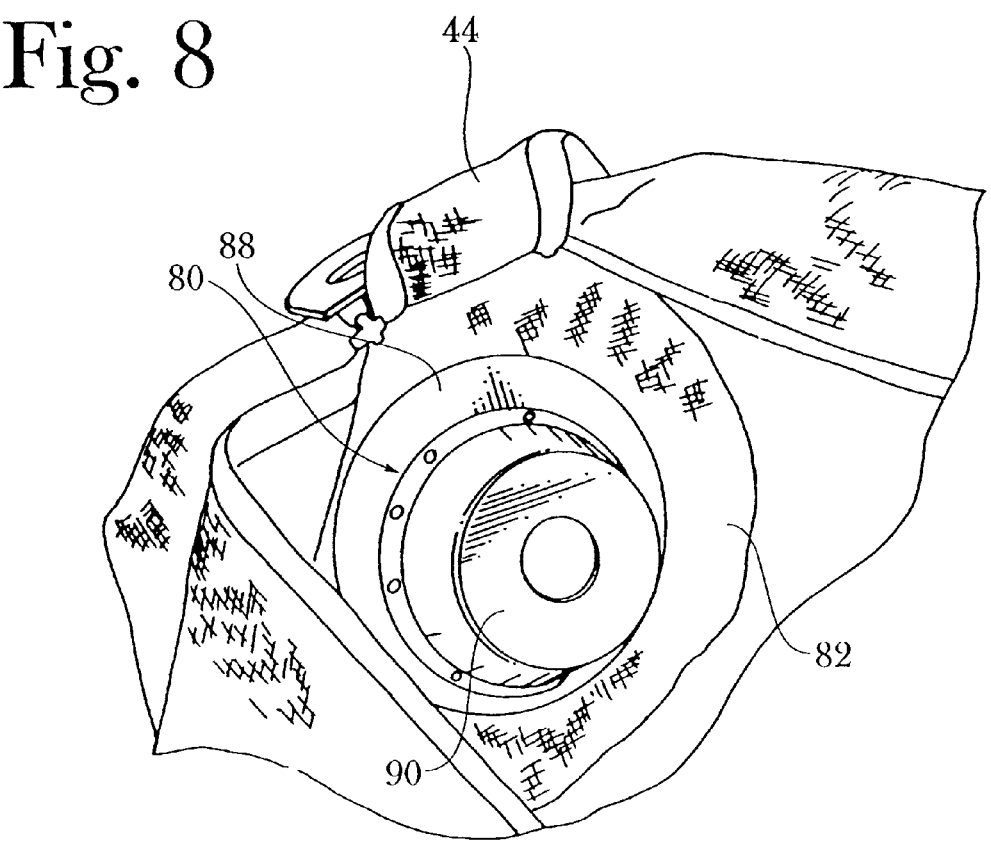
FIG. 8 is an enlarged partial view showing a fan mounted inside the back end of the third preferred embodiment of the sports bag.

FIGS. 6–9 disclose a third embodiment of the present invention as bag 68 which is shown as generally tubular in shape. As shown in FIG. 7, the interior of bag 68 includes an unobstructed cavity 116 extending from top 24 to said bottom 14. Bag 68 includes only one ventilation assembly 69 having an end flap 70 (FIG. 6) secured by a zipper 71. This third embodiment is effective in spite of limiting the number and size of flaps to a pair of smaller end flaps, due to the inclusion in back end 74 of a fan assembly 80 (FIG. 7) which includes a ventilating fan 76 built into a wall 78 located beneath an end flap 72. Fan 76 is a conventional small electric fan, such as the type used for cooling a micro-computer.

Fan 76 is preferably geared to exhaust outwardly after drawing air through bag 68. Of course, fan 76 could be geared to blow air into bag 68 through fan assembly 80, however, the former configuration is preferable because it results in greater and more uniform air circulation through cavity 116.

Figure 9:
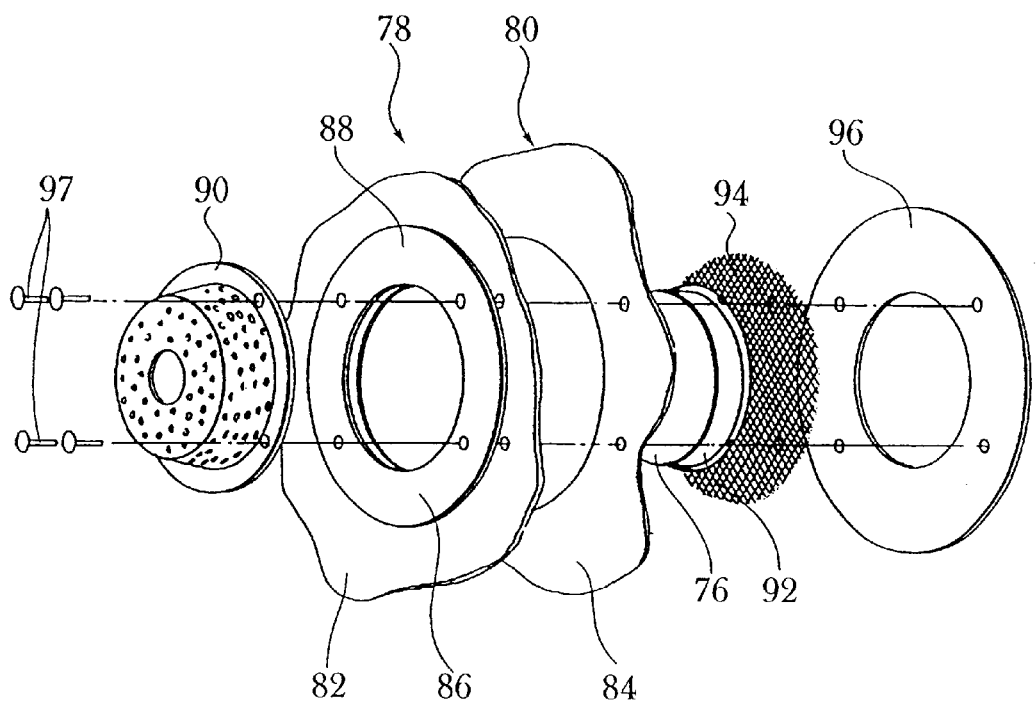
FIG. 9 is an exploded view of the fan structure showing its mounting on the back end of the third preferred embodiment of the sports bag of the present invention.

As illustrated in the exploded view in FIG. 9, fan assembly 80 comprises a fan 76 which extends through wall 78, shown as double-walled at 82 and 84 for strengthened support for fan 76, and a central aperture 86 that opens through an inner supporting ring 88 into a protective housing 90. A peripheral flange 92 integral with motor 80 abuts the outer surface (not shown) of wall 84. Housing 90 is rigid to protect motor 80 from damage and is freely perforated for unrestricted air flow therethrough. A mesh screen 94 covers the exhaust port of fan 76 to prevent external debris from entering. A supporting ring 96 provides additional external protection for fan 76 and increases the rigidity of back end 74 (FIG. 7). When assembled, fan assembly 80 is secured with rivets 97, although any suitable fastener could be substituted for rivets 97. The mounting arrangement of fan assembly 80 ensures that fan 76 remains within the interior of bag 68 (FIG. 8) and that no portion protrudes from back end 74, where it would be prone to damage.

Any convenient means of powering fan 76 is within the scope of the invention. For instance, an electric cord (not shown) can be hard-wired to motor 80 on one end and including a standard plug on the other end. Such a cord could be stored in a small zippered pouch 102 above end flap 72 (FIG. 7). Alternatively, motor 80 can be battery powered or powered through an AC/DC adapter (both not shown).

The inventive bags may include many conventional features which are known in the art. For example, a side pouch 104, shown in FIG. 1 on the exterior surface of flap 30, may be included. (In this vein, an exterior compartment can be added to any of the flaps, ranging in size from small enough for keys to large enough for tennis racquets or ice skates. Side pouches are preferably sealed, so that dirt and debris which temporarily sticks to articles placed therein will not soil the environment through which the bag passes.) A small pocket may also be located on an interior wall (not shown). As shown in FIGS. 1 & 2, loops 106 at opposite ends of top 24 may be included as extra handles or to carry hockey sticks. A removable laundry bag (not shown) may also be included to allow smaller items, such as T-shirts and undergarments to be easily removed from the bag and laundered.

It is clear from the above that the objects of the invention have been fulfilled.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention as defined in the appended claims.

Further, the purpose of the Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of the application, which is measured solely by the claims, nor is intended to be limiting as to the scope of the invention in any way.

It can be seen from the above that an invention has been disclosed which fulfills all the objects of the invention. It is to be understood, however, that the disclosure is by way of illustration only and that the scope of the invention is to be limited solely by the following claims.

I claim as my invention:

1. A bag, comprising:
   a shell formed of water-resistant material and including an interior portion, an exterior portion, a top, a bottom, first and second end walls, and first and second side walls;
   a ventilation assembly located on one of said first and second end walls and said first and second side walls, said ventilation assembly including the following features:
   a ventilation flap formed of water-resistant material and having an open position and a closed position;
   means for selectively opening and closing said ventilation flap;
   a ventilation opening located between said ventilation flap and said interior portion when said ventilation flap is in said closed position; and
   a mesh lining formed of porous material, said mesh lining being affixed to said shell and spanning said ventilation opening;
   wherein said ventilation flap substantially covers said ventilation opening when said ventilation flap is in said closed position, thereby preventing air circulation between said exterior and interior portions through said ventilation opening, and said ventilation flap exposes said ventilation opening to said exterior portion when said ventilation flap is in said open position, thereby allowing air to freely circulate on between said exterior and interior portions through said ventilation opening;
   wherein said ventilation assembly comprises a first ventilation assembly located on said first end wall, said bag further comprising a fan assembly including a fan for circulating air through said bag.

2. The bag of claim 1, wherein said ventilation assembly comprises a first ventilation assembly located on said first side wall, and further comprising a second ventilation assembly located on said second side wall, wherein said second ventilation assembly comprises substantially the same features as said first ventilation assembly and functions in substantially the same manner as said first ventilation assembly.

3. The bag of claim 2, further comprising a third ventilation assembly located on said first end wall, and a fourth ventilation assembly located on said second end wall, wherein said third and fourth ventilation assemblies comprise substantially the same features as said first ventilation assembly and function in substantially the same manner as said first ventilation assembly.

4. The bag of claim 1, wherein said means for selectively opening and closing said ventilation flap comprises a zipper.

5. The bag of claim 1, wherein the surface area of said ventilation flap is equal to at least 50 percent of the surface area of said one of said first and second side walls and said first and second end walls.

6. The bag of claim 5, wherein the surface area of said ventilation flap is equal to 75–90 percent of the surface area of said one of said first and second side walls and said first and second end walls.

7. The bag of claim 1, wherein said mesh lining is formed of nylon.

8. The bag of claim 1, wherein said bag further comprises:

an elongated flap located on said top;

two parallel zippers extending along the length of said elongated flap, each of said zippers having a zipper pull;

a rigid handle attached to said zippers pulls and spanning the width of said elongated flap for selectively opening and closing said elongated flap.

9. A bag, comprising:

a shell formed of water-resistant material and including an interior portion, an exterior portion, a top, a bottom, first and second end walls, and first and second side walls;

a ventilation assembly located on one of said first and second end walls and said first and second side walls, said ventilation assembly including the following features:

a ventilation flap formed of water-resistant material and having an open position and a closed position;

means for selectively opening and closing said ventilation flap;

a ventilation opening located between said ventilation flap and said interior portion when said ventilation flap is in said closed position; and a mesh lining formed of porous material, said mesh lining being affixed to said shell and spanning said ventilation opening;

wherein said ventilation flap substantially covers said ventilation opening when said ventilation flap is in said closed position, thereby preventing air circulation between said exterior and interior portions through said ventilation opening, and said ventilation flap exposes said ventilation opening to said exterior portion when said ventilation flap is in said open position, thereby allowing air to freely circulate on between said exterior and interior portions through said ventilation opening;

wherein said bag further comprises first and second straps for carrying said bag on the back of a person, each of said first and second straps forming a loop and including a securing strap for connecting said first strap and said second strap across the chest of said person when said bag is being carried on the back of said person.

10. The bag of claim 9, wherein each of said first and second straps further comprises a padded portion.

11. The bag of claim 1, wherein said bag further comprises:

a fan flap formed of water-resistant material and having an open position and a closed position;

means for selectively opening and closing said fan flap;

a fan opening located between said fan flap and the interior of said bag when said fan flap is in said closed position; and said fan assembly being affixed to said shell and covering said opening;

wherein said fan flap completely covers said fan opening when said fan flap is in said closed position, thereby preventing air circulation between the exterior and interior of said bag through said fan opening, and said flap exposes said fan opening to the exterior of said bag when said flap is in said open position, thereby allowing said fan to circulate air between the exterior and interior of said bag through said fan opening.

12. The bag of claim 1, wherein said fan assembly is located on said second end wall.

13. The bag of claim 1, wherein said fan assembly further comprises a housing for protecting said fan from damage, said housing at least partially enveloping.

14. The bag of claim 1, wherein said fan is powered by alternating current.

15. The bag of claim 14, wherein said fan assembly further includes a cord for powering said fan by conventional household current.

16. The bag of claim 1, wherein said fan is powered by direct current.

17. The bag of claim 16, wherein said fan is battery powered.

18. The bag of claim 16, wherein said fan assembly includes an AC adapter.

19. The bag of claim 11, wherein said means for selectively opening and closing said flap comprises a zipper.

20. The bag of claim 11, wherein said fan opening is located on said second end wall.

21. The bag of claim 20, wherein said fan is adapted to draw air into said bag through said opening of said first ventilation assembly, through the interior of said bag, and out of said bag through said fan opening.

* * * * *

UNITED STATES PATENT AND TRADEMARK OFFICE
CERTIFICATE OF CORRECTION

PATENT NO. : 6,386,414 B1
DATED : May 14, 2002
INVENTOR(S) : Edward Kilduff

It is certified that error appears in the above-identified patent and that said Letters Patent is hereby corrected as shown below:

<u>Title page,</u>
Item [56], References Cited, U.S. PATENT DOCUMENTS, insert therefor
-- 4,949,842 <u>A</u> * 8/1990 Mokiao, II --.

Signed and Sealed this

Eighth Day of October, 2002

*Attest:*

JAMES E. ROGAN
*Attesting Officer* *Director of the United States Patent and Trademark Office*